United States Patent [19]

Flynn

[11] 4,085,650

[45] Apr. 25, 1978

[54] HINGE SECURITY STUD

[76] Inventor: Jean Louis Flynn, P.O. Box 1868, Deland, Fla. 32720

[21] Appl. No.: 772,725

[22] Filed: Feb. 28, 1977

[51] Int. Cl.² .................................... F16B 25/00

[52] U.S. Cl. .................................... 85/41; 16/137; 292/300

[58] Field of Search .................... 85/41, 46, 47, 9 R; 16/137; 292/300, 301, 251

[56] References Cited

U.S. PATENT DOCUMENTS

| | | | |
|---|---|---|---|
| 742,525 | 10/1903 | Tower | 85/9 R X |
| 1,126,531 | 1/1915 | Liebmann | 85/41 |
| 1,190,069 | 7/1916 | Abernethy | 85/41 X |
| 1,923,721 | 8/1933 | Glenn | 16/137 X |
| 3,031,049 | 4/1962 | Somville | 85/45 X |
| 3,337,925 | 8/1967 | Meyer | 85/9 R X |
| 3,937,506 | 2/1976 | Dean | 16/137 |
| 3,970,340 | 7/1976 | Taft | 292/300 |

FOREIGN PATENT DOCUMENTS

| | | | |
|---|---|---|---|
| 733,821 | 4/1943 | Germany | 151/33 |

*Primary Examiner*—Ramon S. Britts

*Attorney, Agent, or Firm*—Duckworth, Hobby, Allen & Pettis

[57] ABSTRACT

A stud for attaching to a door hinge to prevent the removal of the door by the removal of the hinge pins. The security stud has an elongated screw having self-threaded metal threads at the end thereof and wood threads between the metal threads and the head of the screw so that the screw can be threaded into both metal and wooden doors. The head of the screw has dual bevel portions abutting each other in opposite directions; and a stud extending in the opposite direction from the threaded portion of the screw with a slot for a screwdriver tip.

4 Claims, 2 Drawing Figures

HINGE SECURITY STUD

BACKGROUND OF THE INVENTION

The present invetion relates to a hinge security stud attachable to existing doors by the removal of hinge screws and replacing one of the screws with the hinge security stud.

In the past, a great variety of devices have been suggested to prevent an out-swinging door from being easily broken through by the removal of the hinge pins, and then sliding the hinged side of the door out of the jam, and then entering the building. Typical prior devices manufacture special hinges having a protruding member on one side and a matching opening on the other half of the hinge, so that the hinge closes with the protrusion being inserted into the opening. It has also been suggested in the past to use a stud having a specially drilled hole, driven through one hinge and a separate drilled hole in the opposite side to receive the stud when the door closes. Other prior art security devices for hinges locate a member on the door separate from the hinge for engaging a member on the jam, separate from the hinge, to prevent the door from being removed when the hinge pins are removed. Typical prior devices may be seen in the Grumback, U.S. Pat. No. 3,553,984; Hudgins, U.S. Pat. No. 3,866,269; Glenn, U.S. Pat. No. 1,923,721; Vogal, U.S. Pat. No. 2,571,633; and Gakle, U.S. Pat. No. 2,797,432. In contrast to these prior art devices, the present invention provides a simple hinge security stud which will thread directly into both wood and metal doors, and has dual bevelled surfaces for fitting the counter sunk portion of the hinges and a stud that protrudes into an existing opening in the other half of the hinge. One prior patent in the fastener art illustrates a screw type fastener utilizing dual threads, but of a different type and for a different purpose than the present invention.

SUMMARY OF THE INVENTION

A hinge security stud for locking each of the halves of a hinge together when a door is closed, which has a screw body having an elongated threaded portion divided into two parts: one having metal threads; and the other having threads for wooden doors. The threaded portion of the screw has a head portion having a pair of annular bevelled surfaces intersecting for engaging the counter sunk portion of the screw holes in standard door butt hinges. A stud protrudes from the opposite end of the screw from the threaded portion for protruding into an opening in the opposite half of the hinge. The stud portion may have a slot for engaging a screwdriver tip for mounting the security stud.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
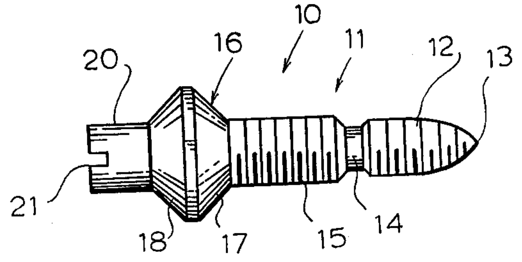
FIG. 1 is a side plan of a hinge security stud in accordance with the present invention.
Figure 2:
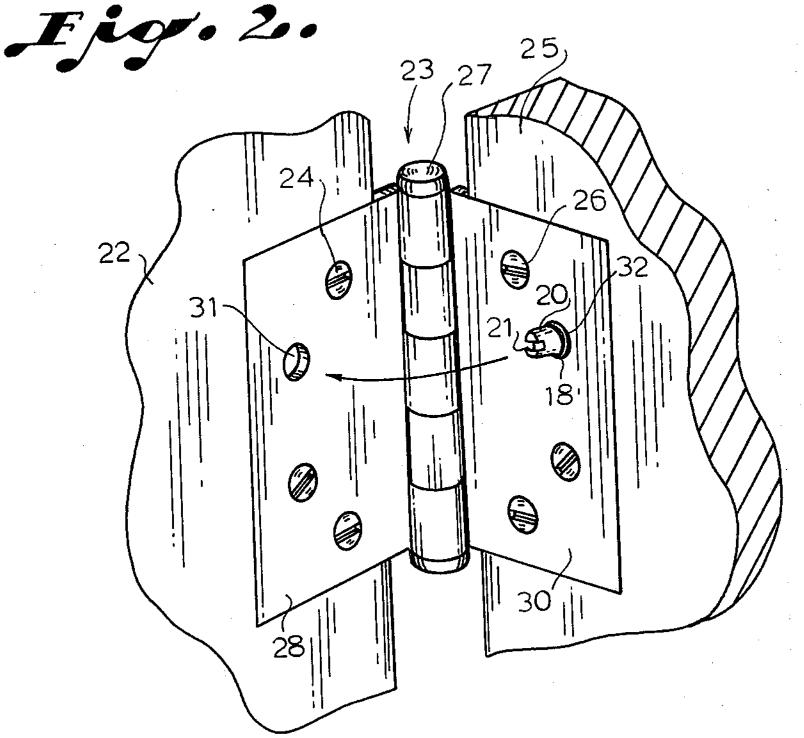
FIG. 2 is a perspective view of the security stud of FIG. 1 mounted to a butt hinge supporting a door to a door jam.

Referring now to FIG. 1, a hinge security stud 10 is illustrated having an elongated threaded portion 11 having wood screw threads 12 forming a point 13 and an annular nonthreaded spacing portion 14, adjacent the threads 12 with a set of machine-screw threads 15 on the other side of the spacing 14. The threaded portion 15 is connected to one side of a screw head 16 having a bevelled portion 17 bevelled towards the thread portion 11 and a bevelled portion 18 bevelled in the opposite direction towards a stud 20. Stud 20 is a cylindrical portion having a slot 21 for a screwdriving tip to drive a security stud into position when mounting to a door hinge. FIG. 2 illustrates a portion of a door having a hinge 23 mounted thereto with screws 24, while a door jam 25 has the other half of the hinge 23 attached thereto with screws 26. The hinge 23 has a hinge pin 27 holding the door attaching half 28, and the door jam attaching portion 30 together. It should be noted that this particular butt hinge screws 24 and 26 in hinge halves 28 and 30 which are exactly opposite each other while some hinges do not have directly opposing hinge screw openings, and would thereby require drilling an opening through one half of the hinge. The opening 31 has the screw removed therefrom as does opening 32. The opening 32, however, has the hinge security stud 10 mounted therein with the stud portion 20 having the slot 21 protruding therefrom for fitting into the opening 31. The bevelled portion 18 engages the bevelled portion of the opening 31 through the hinge half 28. For best operation, it might be required to drill out the wooden portion in the opening 31 inasmuch as the internal threads might interfere with the closing of the door as the stud 20 protrudes thereinto. It is contemplated that the hinge security stud of the present invention would be made of steel, even though it could be made of any material desired, such as brass, bronze, or any other material. It can be as easily used with a steel door as with a wooden door for holding the security hinge stud in place while at the same time supporting one half of the hinge to the jam, or to the door, as desired. The wood screw threads might typically by No. 10–13, while the machine-screw threads might be No. 12–24 NC. The present invention, however, is not to be construed as limited to the particular forms as shown, which are to be considered illustrative rather than restrictive.

I claim:

1. A hinge security stud comprising:

an elongated screw having an elongated threaded portion, a head portion and a stud portion, said head portion having a pair of oppositely disposed back-to-back of said bevelled portions tapering of annular bevelled portions, one inwardly in the direction of said threaded portion and the second of said bevelled portions tapering inwardly in said stud direction, and said stud portion being an elongated generally cylindrical member intersecting said second annular, bevelled portion, and having a screwdriver tip engaging means formed therein, and said threaded portion of said security stud being divided into two portions, one having self-threading wood type threads located on the point of said threaded portion of said screw and the second portion having machine type screw threads located between the head portion of said screw and said self-threading wood type threads.

2. The apparatus in accordance with claim 1, in which said screwdriver tip engaging means is a slot in said stud portion.

3. The apparatus in accordance with claim 1, in which said hinge security stud is made of steel.

4. The apparatus in accordance with claim 1, in which said elongated screw threaded portion has a spacing between said self-threading wood type threads and said machine type threads.

* * * * *

UNITED STATES PATENT AND TRADEMARK OFFICE

CERTIFICATE OF CORRECTION

PATENT NO. : 4,085,650

DATED : April 25, 1978

INVENTOR(S) : JEAN LOUIS FLYNN

It is certified that error appears in the above-identified patent and that said Letters Patent are hereby corrected as shown below:

Column 2, lines 45 and 46, which presently read "back-to-back of said bevelled portions tapering of annular bevelled portions, one inwardly in the" should be amended to read --back-to-back annular bevelled portions, one of said bevelled portions tapering inwardly in the--.

Signed and Sealed this

*Eighth* Day of *January 1980*

[SEAL]

*Attest:*

SIDNEY A. DIAMOND

*Attesting Officer*

*Commissioner of Patents and Trademarks*